United States Patent [19]
Shikata

[11] Patent Number: 6,115,437
[45] Date of Patent: Sep. 5, 2000

[54] SYNCHRONIZING CIRCUIT

[75] Inventor: Takashi Shikata, Kawasaki, Japan

[73] Assignee: Fujitsu Limited, Kawasaki, Japan

[21] Appl. No.: 08/931,444

[22] Filed: Sep. 16, 1997

[30] Foreign Application Priority Data

Sep. 26, 1996 [JP] Japan ................................. 8-254957

[51] Int. Cl.[7] .................................................. H04L 7/02
[52] U.S. Cl. ........................................... 375/360; 375/354
[58] Field of Search ................................... 375/360, 354, 375/359, 371; 370/516, 518; 327/141, 142, 151, 160

[56] References Cited

U.S. PATENT DOCUMENTS

| | | | |
|---|---|---|---|
| 4,617,678 | 10/1986 | Devensky et al. | 375/102 |
| 4,696,016 | 9/1987 | Rozema et al. | 375/20 |
| 4,989,223 | 1/1991 | Katayose et al. | 377/39 |
| 5,282,223 | 1/1994 | Muramatsu | 375/4 |
| 5,537,422 | 7/1996 | Shimpuku et al. | 371/42 |
| 5,652,767 | 7/1997 | Kiyoaga et al. | 375/317 |
| 5,799,048 | 8/1998 | Farjad-Rad et al. | 375/360 |
| 5,857,005 | 1/1999 | Buckenmaier | 375/357 |
| 5,870,446 | 2/1999 | Mc Mhan et al. | 375/371 |

Primary Examiner—Stephen Chin
Assistant Examiner—Mohammad Ghayour
Attorney, Agent, or Firm—Armstrong, Westerman, Hattori, McLeland & Naughton

[57] ABSTRACT

A DSP 20 receives a serial audio signal DATi synchronized with a external clock $\phi i$ with the same cycle as that of the internal clock $\phi o$ and a LR identification signal LRi synchronized in units of words of the serial audio signal DATi, processes the serial audio signal LRi with synchronizing to the internal clock $\phi o$ and provides a serial audio signal DATo and a LR identification signal LRo. A DSP 20 includes a D flip-flop 11 for detecting and holding the rising edge of the LR identification signal LRi, and a counter 15 for counting the internal clock $\phi o$ after this detecting to provide the periodic LR identification signal LRo from its inverse output *Q. If signals DATi and LRi are multiple pairs with different frequencies, the DSP further includes selectors for selecting a pair signal from the signals DATi and LRi by a mode writing signal, and non-inverter for delaying the mode writing signal which is provided to clear inputs of the D flip-flop and the counter through an AND gate, to ignore the signal edge different from that of the signal LRi.

5 Claims, 6 Drawing Sheets

SYNCHRONIZING CIRCUIT

BACKGROUND OF THE INVENTION

1. Field of the Invention

The present invention relates to a synchronizing circuit that synchronizes asynchronous signals and a digital signal processor (DSP) using same.

2. Description of the Related Art

Figure 5:
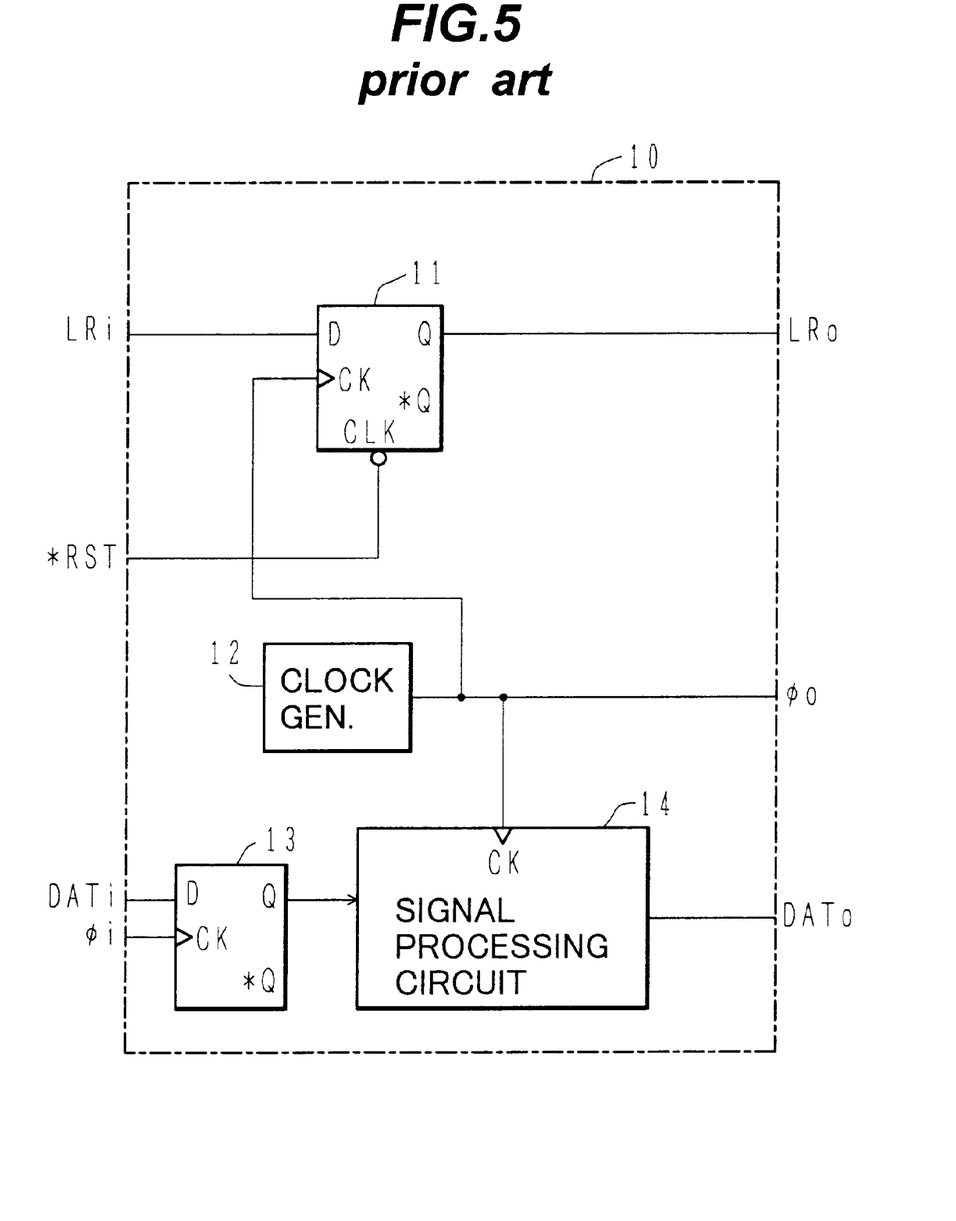
FIG. 5 shows part circuit diagram of a prior art DSP.
Figure 6A:
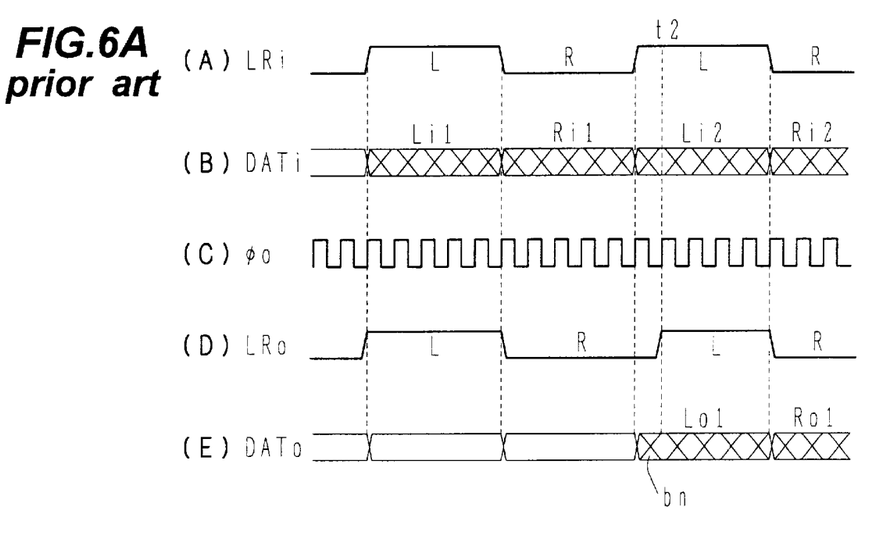
FIGS. 6A and 6B show a timing chart showing the operation of the DSP shown in FIG. 5.
Figure 6B:
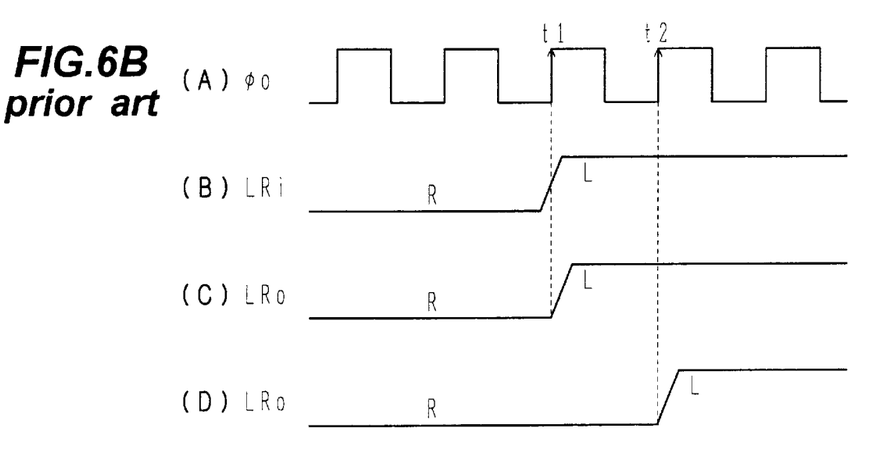

FIG. 5 shows part of a prior art DSP 10 that processes digital audio signals with the time axis compressed. FIGS. 6A and 6B are timing charts showing operations of the configuration of FIG. 5.

As shown in (E) and (F) of FIG. 6A, an LR identification signal LRi and a digital serial audio signal DATi are synchronized in units of words. When the LR identification signal LRi is a high or a low, it indicates that the serial audio signal DATi is a left (L) or a right (R) audio signal, respectively. A D flip-flop 11 synchronizes the external asynchronous LR identification signal LRi to an internal clock $\phi o$ which is from a clock generating circuit 12, and outputs it as an LR identification signal LRo. The internal clock $\phi o$ has the same frequency as that of the external clock $\phi i$. On the other hand, the digital serial audio signal DATi provided externally is held in D flip-flop 13 in synchronization with the external clock $\phi i$. A signal processing circuit 14 processes the audio signal from the D flip-flop 13 in synchronization with the internal clock $\phi o$ and outputs a serial audio signal DATo. To secure a processing time in the signal processing circuit 14, the serial audio signal DATo delays from the serial audio signal DATi for about one cycle time of the LR identification signal. In (B) and (E) of FIG. 6A, data Lo1 and Ro1 of the serial audio signal DATo are obtained by processing data Li1 and Ri1 of the serial audio signal DATi with the signal processing circuit 14, respectively. As the LR identification signal LRi is an asynchronous signal for DSP 10 which processes in synchronization with the internal clock $\phi o$, the relationship between rise times of the LR identification signal LRi and internal clock $\phi o$ is undefined and it differs from one audio device to another.

FIG. 6B corresponds to part of FIG. 6A and, as shown in (A) and (B) of FIG. 6B, when the LR identification signal LRi transits from a low to a high at the time t1 of the internal clock $\phi o$, because of the slight change of the rise time of the LR identification signal LRi to the minus or the plus direction of the time axis, the LR identification signal LRo starts rising at the rising time t1 or the next rising time t2 as shown in (C) or (D) of FIG. 6B, generating a jitter corresponding to one clock cycle.

Therefore, as shown in (D) and (E) of FIG. 6A, while the LR identification signal LRo is a high, if the one-word data Lo1 of the serial audio signal DATo is fetched and converted to parallel data with synchronizing to the internal clock $\phi o$, the most significant bit bn of the data Lo1 will be missing. For example, if the most significant bit bn is a minus sign bit and the next bit is zero, the data Lol will be mistaken as a plus value because of the missing bit and the quality of playback sound changes considerably.

SUMMARY OF THE INVENTION

An object of the present invention is accordingly to provide a synchronizing circuit that enables generation of a synchronized signal from an asynchronous signal and a clock without a jitter.

According to the first aspect of the present invention, there is provided a synchronizing circuit comprising: an edge detecting circuit for detecting an edge of an asynchronous signal and for holding its detection; and a counter to be started to count a clock in response to the detection to make a first synchronized signal corresponding to the asynchronous signal by dividing a frequency of the clock.

With the first aspect of the present invention, because dividing the frequency of the clock by the counter starts in response to the detecting an edge of the asynchronous signal, the signal is synchronized. Also, because this counter divides the frequency of the clock to generate the synchronized signal, high and low voltage level widths of the synchronized signal become constant regardless of the relationship between times of the asynchronous signal edge and the clock edge. This enables generation of the synchronized signal without a jitter.

The first mode of the first aspect of the present invention, it further comprises: a first selector for selectively providing one of signals with different cycle times to one another as the first synchronized signal to the edge detecting circuit in response to a selecting signal; a second selector for selectively providing one of a plurality of output bits of the counter as the second synchronized signal in response to the selecting signal; and an initialization circuit for initializing the edge detecting circuit and the counter when the selecting signal changes.

If the edge detecting circuit detects and holds the edge of the signal from the first selector at selection switching of the first selector after the initialization circuit initializes the edge detecting circuit, the counter starts counting the clock. In this case, a new problem arises in that a first pulse width of the synchronized signal becomes narrower than a required one as shown (I) of FIG. 4, in other words, the edge of the asynchronous signal can not be detected correctly because of the selector's switching edge.

However, with the first mode, because the initialization circuit initializes the edge detecting circuit when the selecting signal changes, the edge detecting circuit can ignore the edge of the signal from the first selector at selection switching of the first selector. Then, the edge detecting circuit detects the next edge of the signal from the first selector, enabling to solve the above-described new problem.

According to the second aspect of the present invention, there is provided a digital signal processor, receiving a first serial signal and a first synchronized signal, for processing the first serial signal to make a second serial signal with synchronizing to a internal clock, providing the second serial signal and a second synchronized signal, the first and second synchronized signals being synchronized with the first and second serial signals in units of its bits, respectively, the signal processor comprising: an edge detecting circuit for detecting an edge of the first synchronized signal and for holding its detection; and a counter to be started to count the internal clock in response to the detection to make the second synchronized signal by dividing a frequency of the internal clock.

With the second aspect of the present invention, in the same manner as the first invention, the synchronized signal can be generated without a jitter. So, If the second serial signal is made parallel while the second synchronized signal is in the same voltage level, the most significant bit can be prevented from missing.

In the first mode of the second aspect of the present invention, the edge detecting circuit and the counter are initialized by a reset signal.

The second mode of the second aspect of the present invention further comprises: a first selector for selectively providing one of signals with different cycle times to one another as the first synchronized signal to the edge detecting circuit in response to a selecting signal; a second selector for selectively providing one of a plurality of output bits of the counter as the second synchronized signal in response to the selecting signal; and an initialization circuit for initializing the edge detecting circuit and the counter when the selecting signal changes.

With the second mode, in the same manner as that of the 1st mode of the 1st aspect, the above new problem can also be solved.

The third mode of the second aspect of the present invention further comprises: a flip-flop for holding a mode signal to provide its content as the selecting signal; wherein the initialization circuit initializes the edge detecting circuit and the counter when a writing control signal to a clock input of the flip-flop or a the reset signal is activated.

In the fourth mode of the second aspect of the present invention, the first serial signal is a stereophonic signal of alternate audio digital signals of first and second channels, and the first synchronized signal is an identification signal of the first and second channels.

With the fourth mode deterioration of the audio quality can be prevented caused by the missing bit.

DESCRIPTION OF THE PREFERRED EMBODIMENTS

Referring now to the drawings, wherein like reference characters designate like or corresponding parts throughout several views, preferred embodiments of the present invention are described below. A signal which becomes active at a low will be indicated with adding "*" to a reference characters.

First Embodiment

Figure 1:
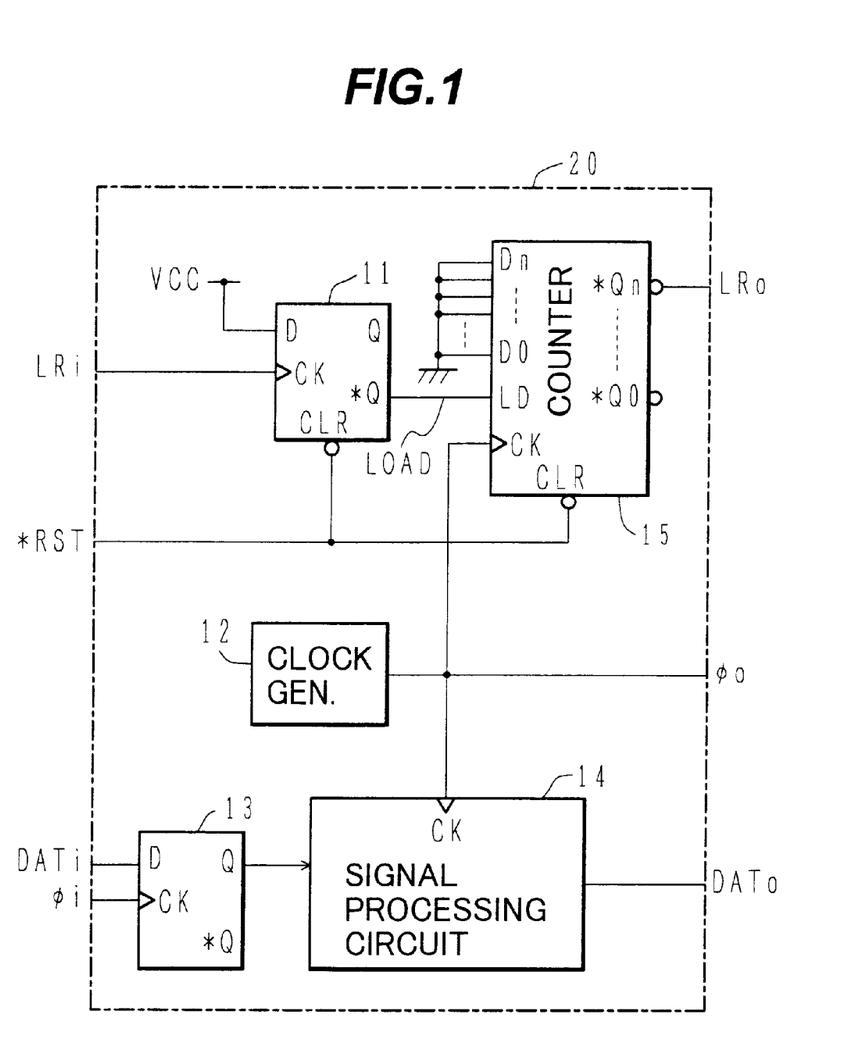
FIG. 1 shows part circuit diagram of a DSP of the first embodiment in accordance with the present invention.

FIG. 1 shows part circuit diagram of a digital signal processor (DSP) 20 of the first embodiment according to the present invention.

An internal clock φo of the DSP 20 is asynchronous to an external clock φi, but has the same frequency as that of the external clock φi. Assume that a cycle time of the internal clock φo is 1 and that of a LR identification signal LRi provided externally is $T=2^{n+1}$.

In a D flip-flop 11, a power supply potential VCC is provided to a data input D as a logical value "1", the LR identification signal LRi is provided to a clock input CK, a reset signal *RST is provided to a clear input CLR, and a load signal LOAD is outputted from a inverse output *Q.

In counter 15, the load signal LOAD is provided to a load signal input LD, the internal clock φo from a clock generating circuit 12 is provided to a clock input CK, the reset signal *RST is provided to a clear input CLR, a logical values of "0" is provided to each of Dn to D0 of (n +1) bit parallel inputs, and the LR identification signal LRo is outputted from the most significant bit *Qn of (n +1) bit parallel inverse outputs *Qn to *Q0. In counter 15, when the load signal input LD is a high, the data of parallel inputs Dn to D0 is loaded and the values obtained by inverting bits of this data is outputted from the inverse outputs *Qn to *Q0.

Other structures are the same as those shown in FIG. 5, and so their explanations are omitted.

Next, the operation of the DSP 20 structured as described above is explained in reference to FIG. 2.

Figure 2:
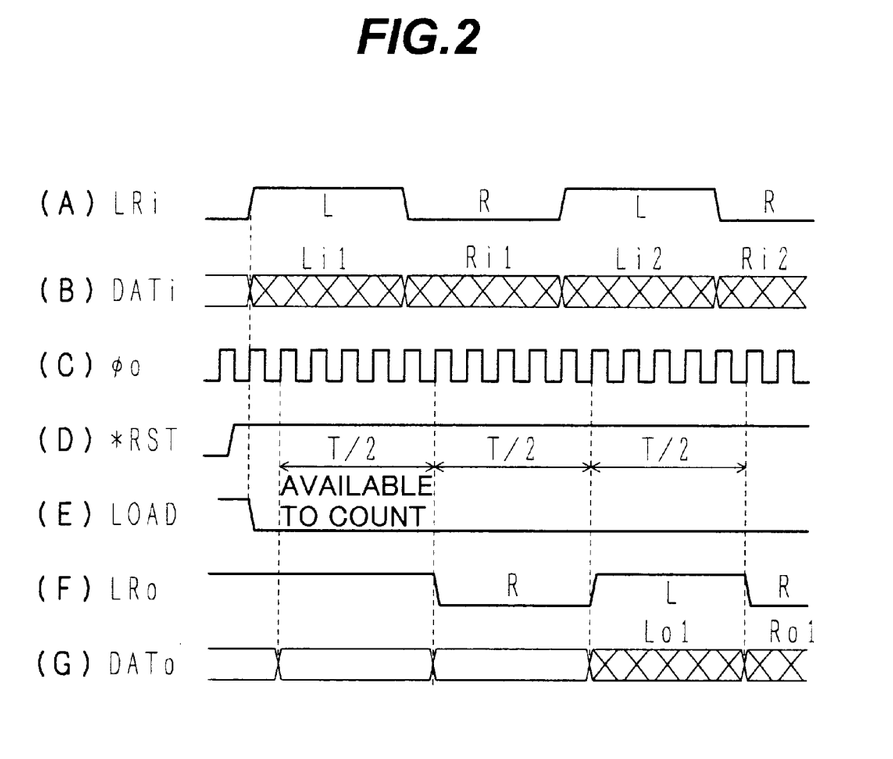
FIG. 2 a timing chart showing the operation of the DSP shown in FIG. 1.

When a power is turned on, the reset signal *RST transits from a low to a high. While the reset signal *RST is at a low, the inverse output *Q of the D flip-flop 11 is initialized to a logical value "1" and the inverse outputs *Qn to *Q0 of the counter 15 are initialized to the logical value "1".

After this, the D flip-flop 11 is clocked by a first rising edge of the LR identification signal LRi, then the load signal LOAD transits to a low and it makes the counter 15 countable, and the counter starts counting the internal clock φo.

The LR identification signal LRo alternates between high and low voltage levels each time $2^{n}+1$ pulses of internal clocks φo have been counted, that is, every interval of the time T/2.

Therefore, the widths of high and low voltage levels of the LR identification signal LRo become the constant value T/2 regardless of the relation between the rise or the fall time point of the LR identification signal LRi and the rise time point of the internal clock φo. Because the words of the audio signal DATo are output in synchronization with the LR identification signal LRo, the serial audio signal DATo can be prevented from missing the bit at reading caused by shifting of voltage level changing point of the LR identification signal LRo. With this, the audio quality can be prevented from deterioration.

The Second Embodiment

Figure 3:
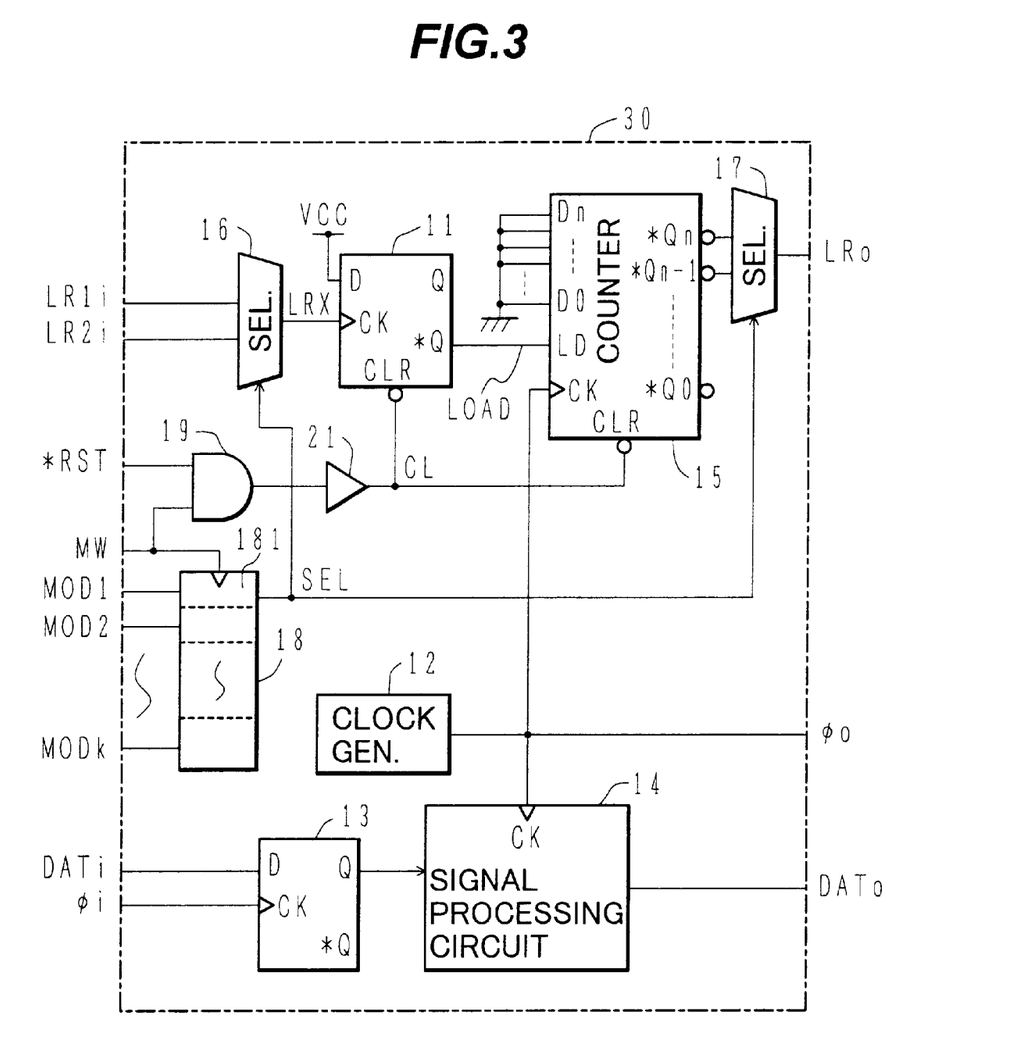
FIG. 3 shows part circuit diagram of a DSP of the second embodiment in accordance with the present invention.

FIG. 3 shows part circuit diagram of a DSP 30 of the second embodiment according to the present invention.

This DSP 30 corresponds to different types of recording media. For example, when a compact disk is used as a recording medium, the LR identification signal LR1i with a cycle time T/2 becomes valid, and when a magnetic tape cartridge is used as a recording medium, the LR identification signal LR2i with a cycle time T becomes valid.

The LR identification signals LR1i and LR2i are provided to a selector 16, one of them is selected, and provided as a signal LRX to the clock input CK of the D flip-flop 11. The signals from the inverse outputs *Qn to *Qn-1 of the counter 15 are provided to a selector 17, one of them is selected, and output as the LR identification signal LRo to an external device (not shown).

Mode signals of k bits MOD1 to MODk are provided to a mode setting register 18 and held in this register when the voltage of a mode writing signal MW rises. The output of the D flip-flop 181, set by the mode signal MOD1, of the mode setting register 18 is provided to the selectors 16 and 17 as a selection control signal SEL.

If the selection control signal SEL is a low, selectors 16 and 17 select the LR identification signal LR1i and the signal of the inverse output *Qn-1, respectively. If the selection control signal SEL is a high, the selectors 16 and 17 select the LR identification signal LR2i and the signal of the inverse output *Qn, respectively. The remaining bits of the mode setting register 18 are used as processing modes for the signal processing circuit 14.

Other structures are the same as those shown in FIG. 1.

Next, the operation of the second embodiment structured as described above is explained in reference to FIG. 4.

Figure 4:
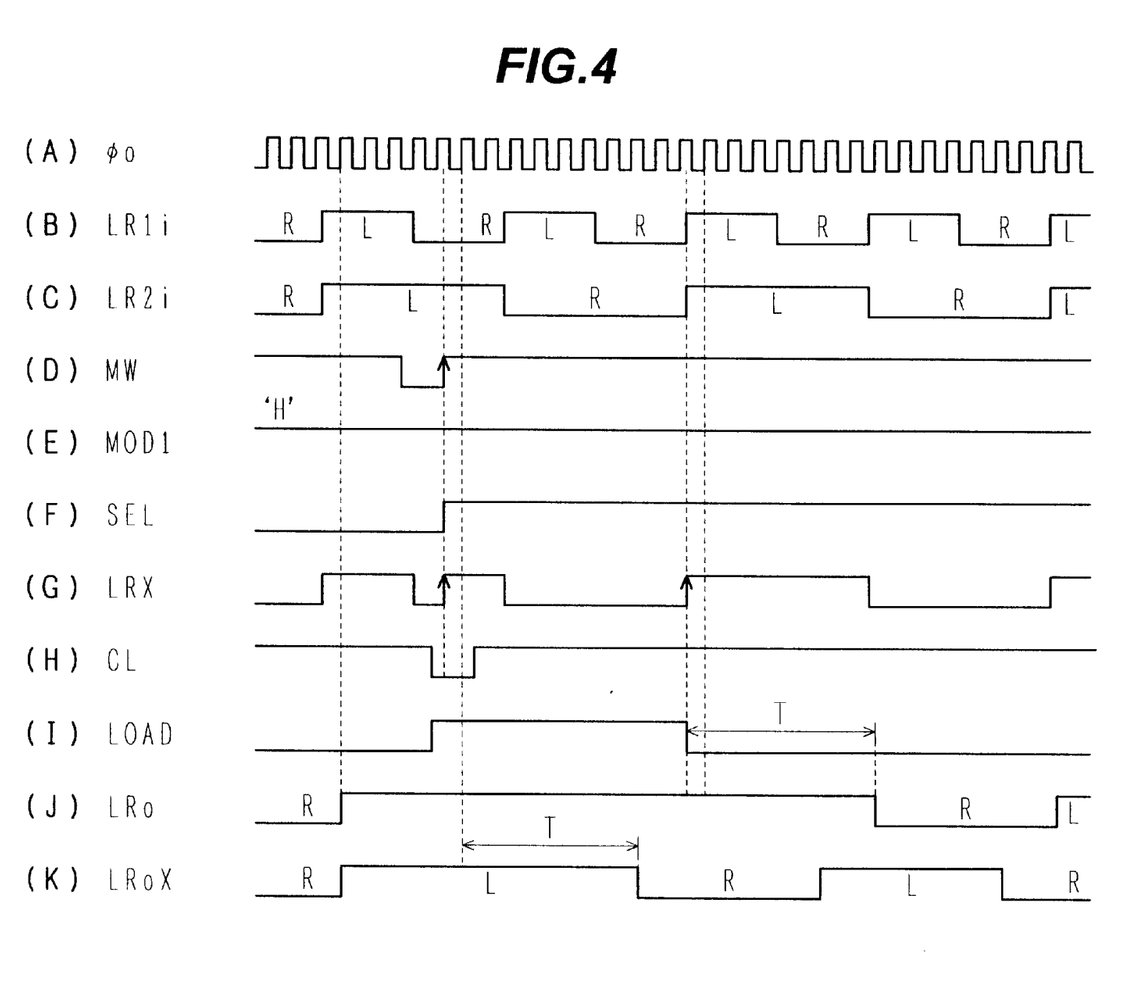
FIG. 4 shows a timing chart showing the operation of the DSP shown in FIG. 3.

First, assume that the mode signal MOD1 is a low (not shown), and the selection control signal SEL is a low, thereby selectors 16 and 17 selecting the LR identification signal LRli and the signal of inverse output *Qn-1 respectively.

Next, the mode signal MOD1 is set to a high as shown in FIG. 4 and the mode writing signal MW transits from a high to a low, then returns to a high. Thereby, the mode signals MOD1 to MODk are held in the mode setting register 18 when the mode writing signal MW rises. The selection control signal SEL transits to a high, and selectors 16 and 17 select the LR identification signal LR2i and the signal of the inverse output *Qn respectively. Then, the output signal LRX of the selector 16 rises, as shown in (G) of FIG. 4, at the rising time of the mode writing signal MW.

The D flip-flop 11 and the counter 15 are initialized when the mode writing signal MW is a low. If the D flip-flop 11 is set by the rising edge of the signal LRX, the counter 15 starts counting the internal clock φo, and so the inverse output *Q of the selector 17 becomes such a signal LRoX as shown in (K) of FIG. 4, arising the problem that the enough processing-time for the signal processing circuit 14 cannot be secured.

However, because the output signal of an AND gate 19 is delayed by a non-inverter 21 and provided as a clear signal CL to the clear inputs CLR of the D flip-flop 11 and the counter 15, the clear signal CL becomes a low when the signal LRX rises as shown in (G) and (H) of FIG. 4. Thereby, the D flip-flop 11 is cleared and the rising edge of the signal LRX is ignored. Therefore, the load signal LOAD becomes a low next time the signal LRX rises, then the counter 15 becomes countable. As a result, the waveform of the LR identification signal LRo becomes such as (J) of FIG. 4, the enough processing-time for the signal processing circuit 14 being secured.

Although preferred embodiments of the present invention has been described, it is to be understood that the invention is not limited thereto and that various changes and modifications may be made without departing from the spirit and scope of the invention.

For example, if the counter 15 has a count enable input, instead of providing the signal of the inverse output *Q of the D flip-flop 11 to the load signal input LD of the counter 15, the signal of a non-inverse output Q of the D flip-flop 11 may be provided to this count enable input. A down counter may be used as the counter 15 and the LR identification signal LRo may be selected from non-inverse outputs Qn to Q0 thereof.

The location of the non-inverter 21 may be the mode writing signal MW side input of the AND gate 19. If the AND gate 19 has a sufficient signal propagation delay, the non-inverter 21 is not necessary.

What is claimed:

1. A synchronizing circuit comprising:
    an edge detecting circuit for detecting an edge of a periodic asynchronous signal and for holding its detection;
    a counter to be started to count a clock in response to said detection to generate a first synchronized signal by dividing a frequency of said clock;
    a first selector for selectively providing one of signals with different cycle times to one another as said first synchronized signal to said edge detecting circuit in response to a selecting signal;
    a second selector for selectively providing one of a plurality of output bits of said counter as a second synchronized signal in response to said selecting signal; and
    an initialization circuit for initializing said edge detecting circuit and said counter when said selecting signal changes.

2. A digital signal processor receiving a first serial signal and a first periodic signal for indicating a kind of said first serial signal in real time, for processing said first serial signal to make a second serial signal synchronized to an internal clock, and for generating a second periodic signal in such a way that said second periodic signal indicates a kind of said second serial signal in real time and a period of said second periodic signal is equal to a period of said first periodic signal, providing said second serial signal and said second periodic signal,
    said signal processor comprising:
        an edge detecting circuit for detecting an edge of said first periodic signal and for holding its detection;
        a counter to be started to count said internal clock in response to said detection to generate said second periodic signal by dividing a frequency of said internal clock;
        a first selector for selectively providing one of signals with different cycle times to one another as said first periodic signal to said edge detecting circuit in response to a selecting signal;
        a second selector for selectively providing one of a plurality of output bits of said counter as said second periodic signal in response to said selecting signal; and
        an initialization circuit for initializing said edge detecting circuit and said counter when said selecting signal changes.

3. A digital signal processor according to claim 2, further comprising:
    a flip-flop for holding a mode signal to provide its content as said selecting signal,
    wherein said initialization circuit initializes said edge detecting circuit and said counter when a writing control signal to a clock input of said flip-flop or a reset signal is activated.

4. A digital signal processor according to claim 2, wherein said first serial signal is a stereophonic signal of alternate audio digital signals of first and second channels, and wherein said first periodic signal is an identification signal of said first and second channels.

5. A digital signal processor receiving a first stereophonic serial signal of alternate audio digital signals of first and second channels and a first periodic identification signal of said first and second channels, for processing said first stereophonic serial signal to make a second stereophonic serial signal synchronized to an internal clock, and for generating a second periodic identification signal of first and second channels of said second stereophonic serial signal in such a way that a period of said second periodic identification signal is equal to a period of said first periodic identification signal, providing said second stereophonic serial signal and said second periodic identification signal, said signal processor comprising:

- an edge detecting circuit for detecting an edge of said first periodic identification signal and for holding its detection;
- a counter to be started to count said internal clock in response to said detection to make said second periodic identification signal by dividing a frequency of said internal clock;
- a first selector for selectively providing one of signals with different cycle times to one another as said first periodic identification signal to said edge detecting circuit in response to a selecting signal;
- a second selector for selectively providing one of a plurality of output bits of said counter as said second periodic identification signal in response to said selecting signal; and
- an initialization circuit for initializing said edge detecting circuit and said counter when said selecting signal changes.

* * * * *